July 22, 1969  S. J. ANGELOVICH  3,457,117

LEAKPROOF ELECTROCHEMICAL CELL

Filed March 23, 1967

INVENTOR.
STEPHEN J. ANGELOVICH
BY
ATTORNEY

United States Patent Office 3,457,117
Patented July 22, 1969

3,457,117
LEAKPROOF ELECTROCHEMICAL CELL
Stephen J. Angelovich, Yonkers, N.Y., assignor to P. R. Mallory & Co., Inc., Indianapolis, Ind., a corporation of Delaware
Filed Mar. 23, 1967, Ser. No. 625,559
Int. Cl. H01m 1/02
U.S. Cl. 136—133   17 Claims

ABSTRACT OF THE DISCLOSURE

A leafproof sealing structure for electrochemical cells having an alkaline electrolyte in which a piece of aluminum is arranged in the leakage path of the electrolyte. The solid reaction products resulting from the contact of aluminum with the electrolyte dissipate the leaking electrolyte so that none of it can reach the exterior.

BACKGROUND OF THE INVENTION

In alkaline dry cells of the general type disclosed in Ruben Patent 2,422,045, considerable difficulties were experienced with electrolyte creepage. Even though the elastic insulating sealing grommet provided a generally air-tight seal for the cell, a small amount of electrolyte would frequently creep along the inner surface of the top closure disc and progressing around the edge of said disc would arrive to the top surface thereof.

The first step toward solution of the problem of electrolyte leakage was made by introduction of the so-called "double-top" construction disclosed and claimed in Williams Patent 2,712,565. In this construction the top closure member combined with the usual metal casing or inner can comprised a pair of metal plates or discs, the center portions of which were interfitting or were nested in each other while their edges were slightly separated. The marginal portions of the inner can and of the top closure discs had an insulating sealing member or collar of elastic material interposed therebetween, with a portion of said sealing collar extending around the edges of the discs and being continued for a short distance. An outer can or jacket encircled the inner can and was constricted at one end directly above the sealing collar to apply sealing pressure thereon, thereby defining a substantially air-tight enclosure for the cell. In the assembled position, an intermediate portion of the sealing collar was forced to extend into the interspace between the edges of the two top discs and thereby further improved the air-tight character of the seal. For best results, the inner top disc was formed of, or was at least plated on both faces thereof with a metal having a low potential with respect to the anode, such as tin for a zinc anode, whereas the outer top disc was composed, or was at least plated on both faces thereof, with a metal having good corrosion resistance to the electrolyte, such as nickel.

While the "double-top" structure represented a definite improvement over prior cell constructions and was used in the quantity production of alkaline dry cells, incrustations would still frequently appear on the outer top disc, particularly after prolonged storage.

The latest major forward step in sealing structures was the so-called "biplate-molded grommet" double-top cell, which is disclosed and claimed in Clune Patent 3,096,217. This structure was based on the recognition that the difficulties experienced with conventional "double-top" cells were due to the interaction of minute amounts of electrolyte, trapped in the interspace between the two top discs, with the dissimilar metals present in such interspace. In the usual form of "double-top" cell, the surface of the inner top disc was generally formed of tin, whereas the surface of the outer top disc was generally formed of nickel. Accordingly, two dissimilar metals, tin and nickel, were present in the two faces defining the interspace between the top discs. Thus, even extremely minute quantities of electrolyte leaking into the interspace, or trapped in such interspace during the closing operation at the time of manufacture, formed a galvanic couple between the outer (tin) surface of the inner top disc and the inner (nickel) surface of the outer top disc. As the couple was effectively short-circuited by the contacting center portions of the top discs, gas was produced by partial electrolytic decomposition of the electrolyte that was between the top discs, forcing the remainder of such electrolyte past the closure of the outer top disc to the outer surface of the said disc. This alkaline electrolyte would react with the carbon dioxide in the atmospheric air forming alkali metal carbonates. As is known, these incrustations, in addition to their unsightly appearance, would cause corrosion, poor contact and other operating difficulties.

In the structure of the Clune patent, the inner surface of the inner top disc was plated with a metal having low potential with respect to the anode, such as tin, and the outer surface of said inner top disc was plated with the same metal that was plated on both surfaces of the outer top disc and having good corrosion resistance to the electrolyte, such as nickel. As the dissimilar metals formerly present in the interspace between the two top discs, tin and nickel, have thus been replaced with the same metal, nickel, no galvanic couple was formed. Thus, no gas generation could take place in said interspace, eliminating the principal cause underlying the formation of incrustations. Further important advantages were obtained in the Clune structure by replacing the prefabricated sealing grommet by molding, preferably injection molding, the said grommet around the top discs. This expedient prevented the trapping of electrolyte in the interspace of the top discs during the closing operation at the time of manufacture. Also, combination of the "double-top" structure with the grommet integrally molded around the top discs greatly increased the length of any leakage path from the inner surface of the inner disc to the outer surface of the outer disc.

SUMMARY OF THE INVENTION

As it appears from the foregoing, substantial progress has been made in recent years in controlling electrolyte creepage, notably through the use of the molded grommet-double top assembly disclosed in the above-mentioned Clune patent. Although many millions of satisfactory cells embodying the said structure were manufactured, the problem of creepage still exists though on a statistically reduced scale. The creepage, which occurs in these cells generally manifests itself by the appearance of incrustations, most often on the negative terminals of the cells. These incrustations form when the alkaline electrolyte used in the cells has by-passed the cells' sealing mechanism and reacted with the carbon dioxide in the atmosphere. These incrustations severely mar the appearance of the cells. In addition, they can corrode components, primarily contact elements, which are either in direct contact with or are close to the cells during their normal operating conditions.

In accordance with the principles of the present invention, a suitable material, such as aluminum, adapted to react with an alkaline electrolyte, is placed somewhere along the path by which the electrolyte must travel if the cell is to leak. A chemical reaction is then initiated at that point between the electrolyte and the aluminum. Once this happens, the electrolyte becomes dissipated, solid reaction products form and external cell leakage is prevented.

BRIEF DESCRIPTION OF THE DRAWING

In order that those skilled in the art may have a better understanding of the invention, reference may be had to the accompanying drawing in which.

DESCRIPTION OF THE PREFERRED EMBODIMENT

Figure 1:
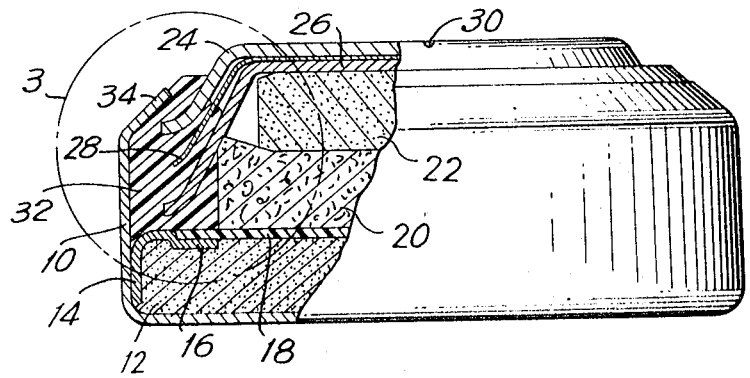
FIG. 1 is a vertical sectional view, having parts in elevation, of a cell embodying the present invention.

Referring now more particularly to the drawing, reference numeral 10 denotes a cylindrical metal can made of nickel-plated steel having a body of depolarizer compound 12 compressed in the bottom portion thereof which compound may be composed of a major portion of mercuric oxide and/or manganese dioxide intimately mixed with a minor portion of graphite, or may be composed of silver oxide in its entirety. A depolarizer sleeve 14 having a slightly depressed flange portion 16 is lining the inner lateral surface of the can and may likewise be formed of nickel-plated steel. A microporous barrier layer 18, which may be constituted of a layer of Synpor is located on flange portion 16 of the depolarizer sleeve. An electrolyte absorbent spacer 20 of Webril (a non-woven fabric made by blending thermoplastic fibers into a cotton web and applying heat and pressure), is resting on the barrier layer and its top is in contact with a porous pressed amalgamated zinc powder anode 22.

The top closure of the cell comprises a pair of nested top discs of which the outer one 24, is nickel-plated on both of its faces, whereas the inner disc 26 is nickel-plated on its outer face and tin-plated on its inner face, which is in pressure contact with the zinc anode. A circular disc 28 of thin aluminum foil, such as one having a thickness of one mil, is inserted between inner top disc 26 and outer top disc 24 prior to their being welded together at 30. To this welded assembly, a grommet 32 of a suitable elastomer, such as polyethylene, is injection molded. The aluminum foil thus comes into intimate contact with the molding material and with the interior surfaces of the metal top discs.

In assembling the cell, a metered quantity of electrolyte, such as an aqueous potassium hydroxide solution containing a substantial percentage of potassium zincate, is introduced into the cell. The described top closure structure is then inserted, so that upon crimping down the mouth portions of can 10, as indicated at 34, grommet 32 will be strongly compressed between flange 16 of depolarizer sleeve and crimped portion 34, thereby sealing the cell.

OPERATION

Figure 2:
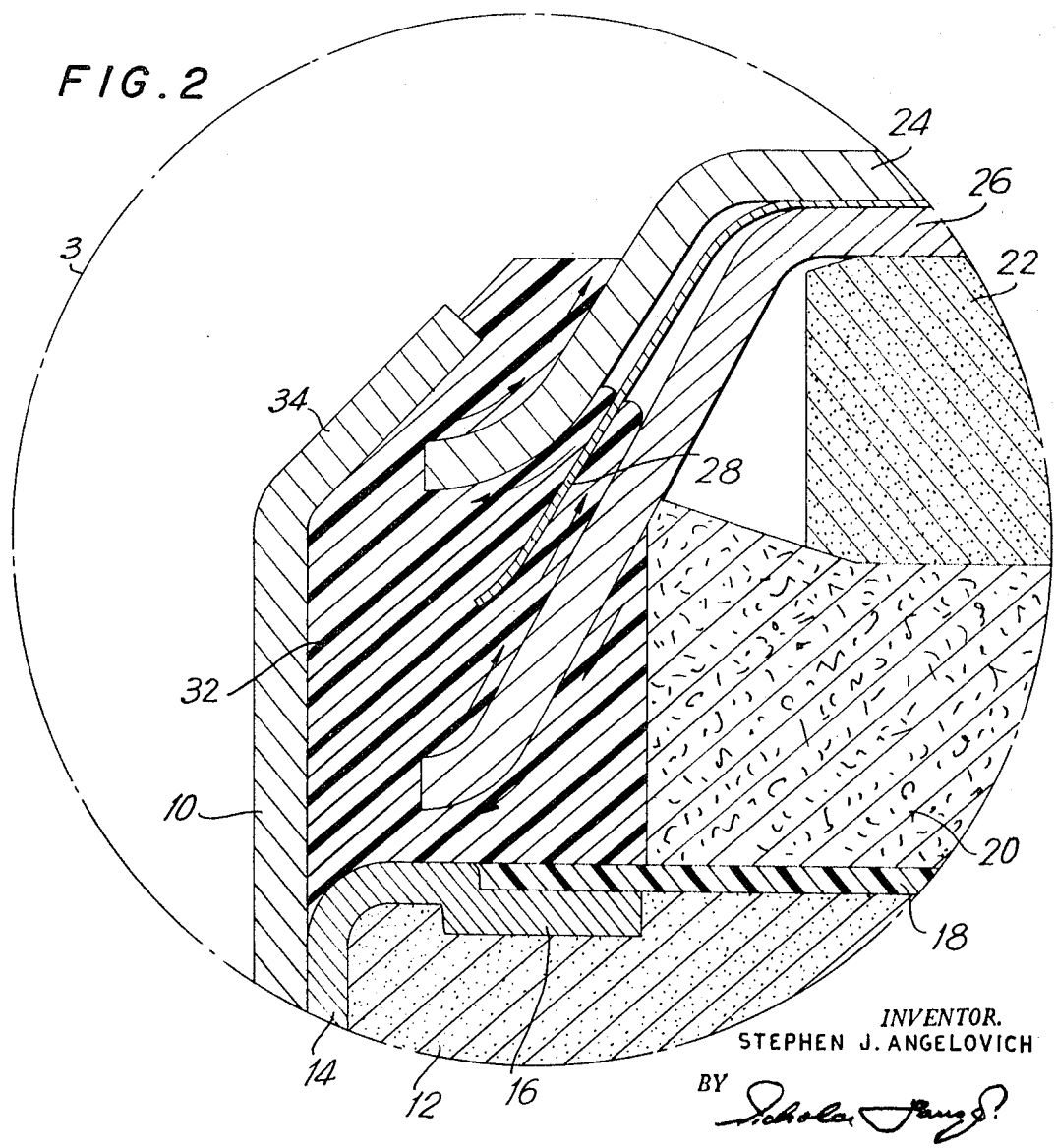
FIG. 2 is a greatly enlarged sectional view of the portion of FIG. 1 enclosed within circle 3.

The operation of the cell of the invention will be best understood by reference to the greatly enlarged fragmentary view shown in FIGURE 2. Let it be considered first the manner in which electrolyte would travel were not the aluminum disc 28 present. The electrolyte would creep first along the interior surface of inner top disc 26 (Region A) and, going around the edge of said disc, continue along the outer surface thereof until it entered the space between the two top discs 26 and 24. From here, it would reverse its direction, would continue along the inner surface of the outer top disc 24, around the edge of said disc and along the outer surface thereof, until it reached the atmosphere (Region B). This path is indicated by arrows in FIGURE 2.

With aluminum disc 28 in place, the electrolyte comes into intimate contact with the aluminum "dam" prior to it ever reaching the atmosphere. The electrolyte used is an alkali metal hydroxide, preferably potassium hydroxide, which contains the zincate ion. The probable reactions which occur are as follows:

$$2Al + 3Zn(OH)_4^{=} \rightarrow 2Al(OH)_4^{-} + 4OH^{-} + 3Zn$$

The zinc is thus deposited on portions of the aluminum by the above reaction. In addition, the aluminum reacts with the potassium hydroxide according to:

$$2Al + 2KOH + 2H_2O \rightarrow 2KAlO_2 + 3H_2$$

The net effect is that the corrosive action of the leaking electrolyte takes place within the sealing mechanism, immobilizing the said electrolyte in the form of solid reaction products. There is also an additional benefit derived, in that with the aluminum, the negative terminal becomes electro-positive and therefore tends to repel moisture from its surface.

Comparative tests carried out with the cells embodying the invention have indicated that after ten weeks at 90% R.H. and 70° F., 50% of the conventional (control) cells leaked, while 0% of the novel sealing structures leaked. At 45% R.H. and 90° F., 67% of the control cells leaked, while 0% of the novel sealing structures leaked. Chemical indicators were used to determine leakage. From these tests, the great superiority of the cells of the invention over conventional cells is clearly apparent.

Although the present invention has been disclosed in connection with a preferred embodiment thereof, variations and modifications may be resorted to by those skilled in the art without departing from the principles of the invention. Thus, instead of providing the aluminum in the form of a disc of foil, the aluminum can be introduced within the sealing structure by spraying, coating, or cladding, and the like. Likewise, it is not absolutely necessary to provide a coating of aluminum on the entire surface but is sufficient to use an annular member or ring of aluminum. The aluminum could also be applied to the inner surface of the outer top disc. While the invention has been explained as applied to a "molded grommet-double top" cell, equal or similar results are obtained by applying the invention to a "molded grommet-single top" assembly. Also, the compressible sealing member or grommet need not be integrally molded to the top disc or discs, but may be in the form of a prefabricated element which is stretched over the circumferential edges of the top disc before final assembly.

When applying the principles of the invention to the "double-top" structure, the material for the inner top disc may be any one of the following:

(1) Bi-plated steel, having tin on the inner surface and nickel on the outer surface.
(2) Tin-plated steel having tin both on its inner and outer surfaces.
(3) Copper.
(4) Aluminum-clad copper, having copper on its inner surface and aluminum on its outer surface.
(5) Stainless steel-clad copper, having copper on its inner surface and stainless steel in its outer surface.
(6) Aluminum-steel-tin clad metal.

The material for the outer top disc may be one of the following:

(1) Stainless steel clad with aluminum on its inner surface.
(2) Nickel-plated steel clad with aluminum on its inner surface.
(3) Nickel clad with aluminum on its inner surface.

I claim:

1. An electrochemical cell comprising a metal can constituting one of the terminals of the cell, a top closure member for said can constituting the other terminal of the cell and comprising an inner and an outer metal top disc having interfitting contacting center regions and their edges spaced from each other, an insulative sealing member confined between cooperating portions of said casing and of said closure member and constituting therewith a sealed enclosure for the cell while maintaining said can and said closure member electrically disconnected from each other, anode and cathode materials having an electrolyte in contact therewith sealed in said enclosure, and a metal body in the interspace between the top discs arranged in the leakage path of said electrolyte capabe of reacting therewith under formation of solid reaction products thereby substantially sealing said leakage path.

2. The cell claimed in claim 1 wherein the top closure member comprises a pair of dished metal discs having their center portion nested in each other and their circumferential portions slightly separated from each other.

3. The cell claimed in claim 1 wherein the anode is zinc and the electrolyte is an alkali metal hydroxide containing zincate ions.

4. The cell claimed in claim 1 wherein the electrolyte is an aqueous solution of an alkali metal hydroxide containing zincate ions and the metal arranged in the leakage path of the electrolyte comprises aluminum.

5. The cell claimed in claim 1 wherein the top closure member comprises an inner top disc and an outer top disc having a disc of aluminum therebetween and in contact therewith.

6. The cell claimed in claim 5 wherein the inner top disc is formed of steel which is tin-plated on its inner surface and is nickel-plated on its outer surface.

7. The cell claimed in claim 5 wherein the inner top disc is formed of steel which is tin-plated on both of its inner and outer surfaces.

8. The cell claimed in claim 5 wherein the inner top disc is formed of copper.

9. The cell claimed in claim 2 wherein the inner top disc is formed of aluminum-clad copper, the inner surface of said disc being constituted by copper and the outer surface of said disc being constituted by aluminum.

10. The cell claimed in claim 5 wherein the inner top disc is formed of stainless steel-clad copper, the inner surface of said disc being constituted by copper and the outer surface of said disc being constituted by stainless steel.

11. The cell claimed in claim 5 wherein the insulative sealing member is molded around the circumferential edges of the inner and outer top discs also embedding the circumferential edge of the interposed disc of aluminum.

12. An alkaline dry cell comprising a metal can, a top closure member therefor comprising an inner and an outer metal top disc having interfitting contacting center regions and their edges spaced from each other, an insulating sealing member compressed between marginal portions of said can and of said discs and also extending into the interspace of said discs, a cathode depolarizer in said can and in electrical contact therewith, a zinc anode spaced from said cathode and in electrical contact with the inner top disc, an alkaline electrolyte interposed between said cathode and said anode, at least the inner surface of the inner top disc being formed of metal having low electrochemical potential with respect to zinc and at least the surface of the outer top disc being formed of metal inert to the electroylte, and a body of aluminum in the interspace between the top discs and capable of forming solid reaction products with any electrolyte that may leak into said interspace.

13. The cell claimed in claim 12 wherein the body of aluminum is in the form of a disc of aluminum foil interposed between said top discs and in contact therewith.

14. The cell claimed in claim 13 wherein the insulating sealing member is molded around the circumferential edges of the top discs, embedding said edges and the circumferential edge of the aluminum disc.

15. The cell claimed in claim 12 wherein the electrolyte is an aqueous solution of an alkali metal hydroxide containing zincate ions.

16. The cell claimed in claim 12 wherein the cathode depolarizer comprises at least one oxide selected from the group consisting of mercuric oxide, manganese dioxide, and silver oxide.

17. The cell claimed in claim 12 wherein the body of aluminum is on the interior surface of the outer top disc.

References Cited

UNITED STATES PATENTS 2,712,565   7/1955   Williams.
3,096,217   7/1963   Clune.

WINSTON A. DOUGLAS, Primary Examiner
A. SKAPARS, Assistant Examiner

U.S. Cl. X.R.
136—107, 111